E. FUCHS.
POWER TRANSMISSION DEVICE.
APPLICATION FILED SEPT. 12, 1917.

1,357,769.

Patented Nov. 2, 1920.

Inventor.
Ernest Fuchs

UNITED STATES PATENT OFFICE.

ERNEST FUCHS, OF BILLANCOURT, FRANCE, ASSIGNOR TO LOUIS RENAULT, OF BILLANCOURT, FRANCE.

POWER-TRANSMISSION DEVICE.

1,357,769. Specification of Letters Patent. Patented Nov. 2, 1920.

Application filed September 12, 1917. Serial No. 190,925.

*To all whom it may concern:*

Be it known that I, ERNEST FUCHS, engineer, of 15 Rue Gustave Sandoz, at Billancourt, Department of the Seine, France, citizen of the French Republic, have invented certain new and useful Improvements in or Relating to Power-Transmission Devices; and I do hereby declare the following to be a full, clear, and exact description of the invention, such as will enable others skilled in the art to which it appertains to make and use the same.

The present invention has for its object a reducing device which serves to drive two parts turning in the same direction the reversal of the drive of the two parts taking place automatically with suppression of the reducer.

The accompanying drawings show, by way of example, a constructional form of the device according to the invention applied to the driving of motor dynamos for automobile vehicles serving for lighting and starting.

Figure 1:
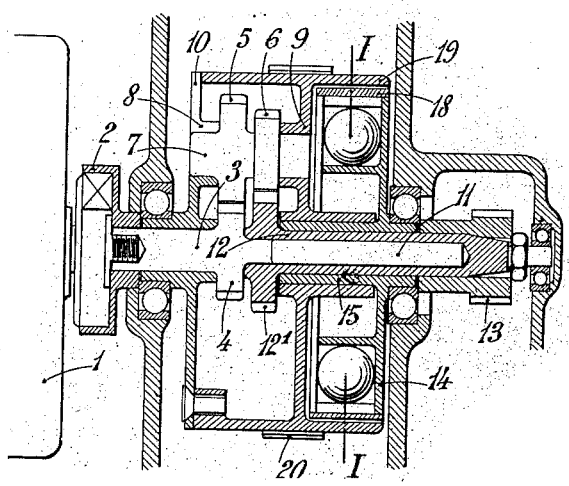
Figure 1 is a vertical section of a reducing device according to the invention.
Figure 2:
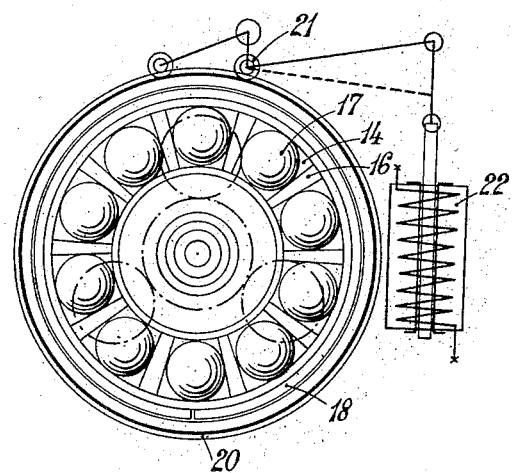
Fig. 2 is a vertical section on the line 1—1 of Fig. 1.

In Fig. 1, the lighting or starting dynamo is represented at 1. It is connected by a clutch 2 to a shaft 3 forming part of the device, a toothed wheel 4 is mounted on the shaft 3 and gears into a group of wheels 5 and 6 fixed on a shaft 7 carried in bearings 8 and 9 forming part of a cylindrical casing 10 mounted loosely on the shaft 3. The shaft 3 is carried at its rear part in a hollow 11 in a hollow shaft 12 provided with a toothed wheel 12' gearing into the wheel 6 extending beyond the other end of the casing and to which is fixed a pinion 13 in relation with the motor.

The centrifugal mass clutch situated in the right hand part of the casing 10 is composed of a plate 14 forming part of a sleeve 15 fast on the shaft 12. The plate 14 has a certain number of ribs 16 which divide it up into compartments each containing a mass 17 of spherical form which bears against a spring 18 surrounding the whole of the balls. This spring is also capable of bearing when stretched against a cylindrical part 19 of the casing 10 in such a way as to carry it round in its rotary movement. The outer part of the casing 10 has likewise a brake band 20 embracing all parts one of its ends 21 being worked by means of an electro-magnet 22, traversed by the current of the dynamo 1, so that if this dynamo acts as a motor for starting the electric magnetic brake 20 stops all rotation of the casing 10.

The working of the apparatus will be easily understood. If it be desired to start the motor, the current is sent into the dynamo 1 working as a starting motor, the electro-magnet 22 is excited while rendering the casing 10 immovable by reason of the action of the brake 20. The transmission of motion to the pinion is effected by the shaft 3, the wheel 4, the wheel 5, the wheel 6, the wheel 12' with the reduction possessed by the train of gears 4, 5, 6 and 12'.

As soon as the motor is started the speed of the shaft 12 and consequently of the plate 14 increases the pressure of the masses against the spring 18 which bears against the periphery 19, the dynamo stops however working as a motor and the electro-magnet 22 ceases to be excited which liberates the casing 10. The casing, the centrifugal mass clutch, and the gear wheels then form a whole carrying around the shaft 4 at the same speed as the pinion 13, that is to say, without any demultiplication.

I claim:

1. A driving mechanism adapted to be used in connection with motor generators for internal combustion engines, comprising a two-part shaft, a casing loosely mounted on one part of the shaft, a centrifugal clutch mounted on the other part of the shaft, intermeshing gearing carried by both parts of the shaft and the casing, a brake band encircling the casing and an electromagnet for controlling the brake, said brake being applied when the magnet is energized.

2. A driving mechanism adapted to be used in connection with a motor generator for internal combustion engines, comprising a two-part shaft, a casing loosely mounted on one part of the shaft, a centrifugal clutch adapted to secure the casing to the other part of the shaft, differential gearing carried by the casing and by both parts of the shaft and an electromagnetically controlled brake for preventing the movement of the casing until the shaft exceeds a predetermined speed.

3. A driving mechanism adapted to be used in connection with a motor generator for internal combustion engines, comprising a two-part telescoping shaft, a casing loosely mounted on one part of the shaft, a brake band operated by an electromagnet encircling said casing, a centrifugal clutch mounted on the other part of said shaft, gears carried by both parts of the shaft, gears carried by the casing intermeshed with said first mentioned gears, the centrifugal clutch adapted to lock both shafts together by its engagement with the casing upon the release of the brake when the desired speed is reached.

4. A driving mechanism adapted to be used in connection with a motor generator for internal combustion engines, comprising a two-part telescoping shaft, means carried by the outside ends of said shaft for connection with either driving or driven mechanism, gearing and clutch mechanism connecting both of said shafts comprising a casing loosely mounted on one part of the shaft, braking means for locking the casing against rotation, said casing having journaled therein differential gears, gears carried by both parts of the shaft intermeshed with said first mentioned gears and a centrifugal ball clutch, inclosed within and adapted to engage the casing, secured to the other part of the shaft for rotating said casing upon the release of the brake.

5. A driving mechanism adapted to be used in connection with a motor generator for internal combustion engines, a two-part shaft, a casing loosely mounted on one part of the shaft, intermeshing gearing carried by both parts of the shaft and the casing, a brake for the casing, and a centrifugal clutch secured to the other part of the shaft comprising a housing for a series of balls, spacing elements between said balls and a split ring encircling the balls against which the same are forced by centrifugal action, causing said ring to frictionally engage the overlying portion of the casing and thereby lock the two parts of the shaft together, resulting in a uniform rotation thereof upon release of the brake.

In testimony whereof I affix my signature in presence of two witnesses.

ERNEST FUCHS. [L. S.]

Witnesses:
JOSEPH GEMENIL,
HIPPOLYTE JOFFE.